(12) United States Patent
Lin

(10) Patent No.: US 6,995,731 B2
(45) Date of Patent: Feb. 7, 2006

(54) MULTIPLE COIL ANTENNA FOR A TIRE PARAMETER SENSING SYSTEM WITH INDUCTIVELY COUPLED TIRE-BASED UNITS

(75) Inventor: Xing Ping Lin, Orchard Lake, MI (US)

(73) Assignees: TRW Automotive U.S. LLC, Farmington Hills, MI (US); Societe de Technologie MICHELIN, Clermont-Ferrand (FR)

( * ) Notice: Subject to any disclaimer, the term of this patent is extended or adjusted under 35 U.S.C. 154(b) by 5 days.

(21) Appl. No.: 10/789,567

(22) Filed: Feb. 27, 2004

(65) Prior Publication Data
US 2005/0190114 A1 Sep. 1, 2005

(51) Int. Cl.
H01Q 1/36 (2006.01)
(52) U.S. Cl. .................... 343/895; 152/152.2; 343/866; 343/711; 343/788
(58) Field of Classification Search ................ 343/866, 343/742, 711, 895; 152/152.2
See application file for complete search history.

(56) References Cited

U.S. PATENT DOCUMENTS

| 3,614,732 | A |  | 10/1971 | Lejeune et al. ............. 340/448 |
|---|---|---|---|---|
| 4,263,579 | A |  | 4/1981 | Corgan et al. ............... 340/447 |
| 4,717,905 | A |  | 1/1988 | Morrison, Jr. et al. ....... 340/447 |
| 5,824,891 | A |  | 10/1998 | Monson ..................... 73/146.5 |
| 5,847,683 | A | * | 12/1998 | Wolfe et al. ................. 343/866 |
| 6,028,559 | A |  | 2/2000 | Satoh et al. ................. 343/744 |
| 6,304,610 | B1 |  | 10/2001 | Monson ..................... 375/259 |
| 6,470,933 | B1 |  | 10/2002 | Volpi ....................... 152/152.1 |
| 6,809,700 | B2 | * | 10/2004 | Benedict et al. ............. 343/872 |
| 6,836,253 | B2 | * | 12/2004 | Strache et al. .............. 343/713 |

* cited by examiner

Primary Examiner—Hoang V. Nguyen
Assistant Examiner—Huedung X. Cao
(74) Attorney, Agent, or Firm—Tarolli, Sundheim, Covell & Tummino L.L.P.

(57) ABSTRACT

An antenna (96) for use in inductive coupling two devices (34 and 42) includes a first coil (180) having a first inductance value, a second coil (190) having a second inductance value, and a capacitor (198) having a capacitance value. The first and second coils (180 and 190) and the capacitor (198) form a tank circuit (196) having a predetermined resonant frequency. The capacitance value of the capacitor (198) varies inversely to an equivalent inductance value of the tank circuit (196) for providing the predetermined resonant frequency. The first and second coils (180 and 190) are connected in parallel with one another so that the equivalent inductance value of the tank circuit (196) is less than each of the first and second inductance values and the capacitance value of the capacitor (198) is maintained above a predetermined threshold value for providing stability to the tank circuit (196).

8 Claims, 3 Drawing Sheets

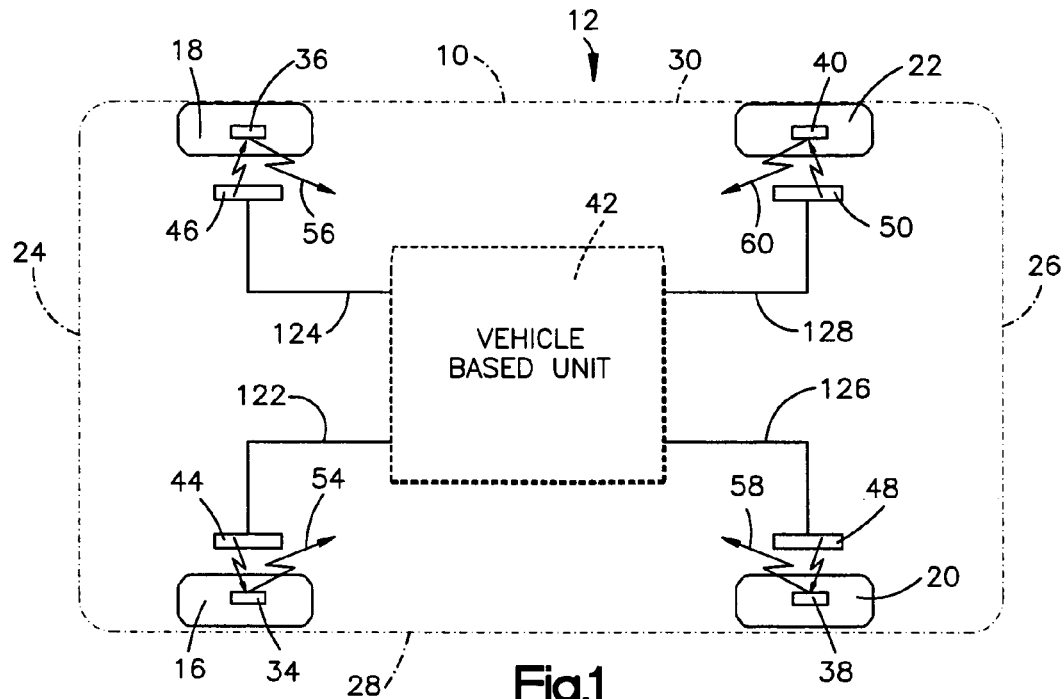
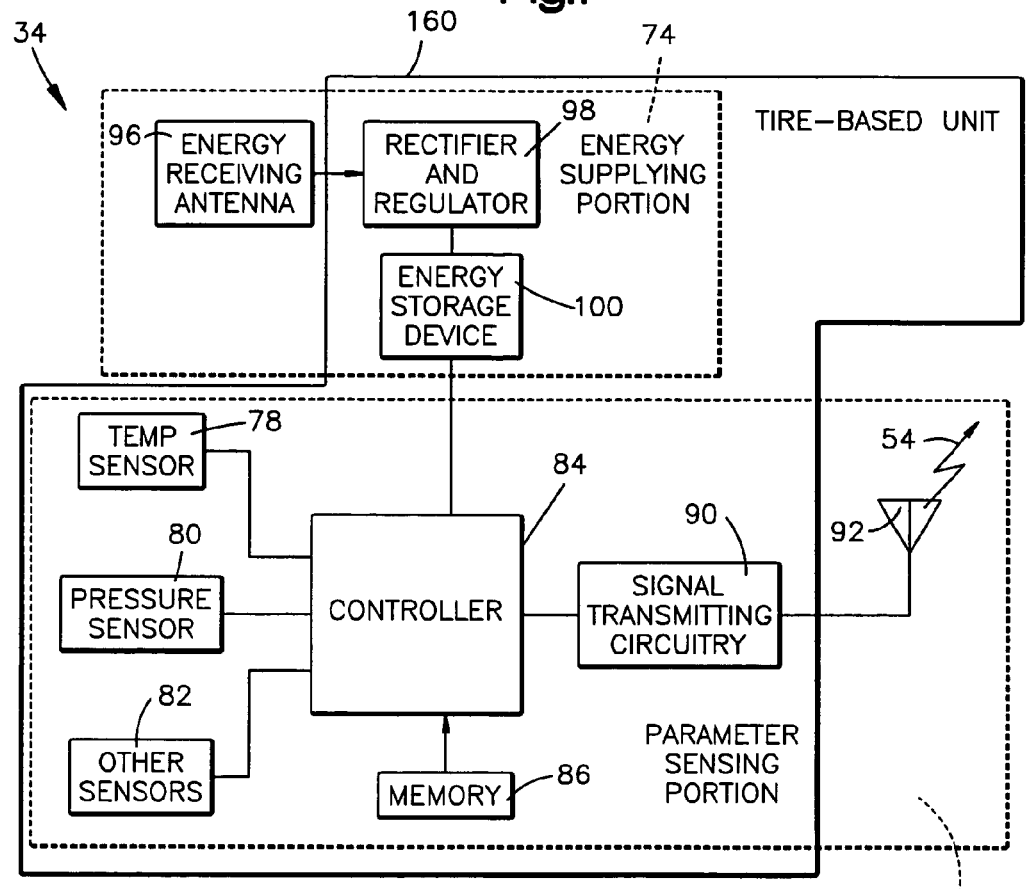

MULTIPLE COIL ANTENNA FOR A TIRE PARAMETER SENSING SYSTEM WITH INDUCTIVELY COUPLED TIRE-BASED UNITS

TECHNICAL FIELD

The present invention relates to an antenna for use in inductive coupling two devices. More particularly, the present invention relates to an antenna for a tire parameter sensing system with inductively coupled tire-based units.

BACKGROUND OF THE INVENTION

Tire parameter sensing systems for vehicles typically include a plurality of tire-based units and a single vehicle-based unit. Each tire-based unit has an associated tire of the vehicle and is operative to sense at least one parameter of the tire. The sensed parameter(s) may include temperature, pressure, etc. Each tire-based unit is also operative to transmit a parameter signal indicative of the sensed parameter(s) to the vehicle-based unit. The vehicle-based unit is connected to a display. In response to receiving a parameter signal from a tire-based unit, the vehicle-based unit outputs a signal to the display. The display is responsive to the signal for displaying the sensed tire parameter(s).

It is common for the tire-based units of a tire parameter sensing system to be battery powered. Battery powered tire-based units, however, have specific limitations, such as, for example, a limited life, a limited current supply, and a limited operating temperature range. The design of a tire parameter sensing system using battery powered tire-based units must be mindful of these limitations. As a result, it is common for a battery powered tire-based unit to transmit parameter signals only in response to a determination that a sensed parameter is outside of a desired range. For example, if the desired pressure range is 32 to 36 pounds per square inch ("psi"), the battery powered tire-based unit may transmit a parameter signal to the vehicle-based unit only when the sensed tire pressure is determined to be below 32 psi or above 36 psi. By limiting the transmissions of the parameter signal, the battery life of the battery powered tire-based unit may be extended.

In some tire parameter sensing systems, the tire-based units do not include batteries. Tire-based units that do not include batteries receive energy through induction. Devices for producing an electromagnetic field are located adjacent the tires having the tire-based units. The tire-based units include a coil antenna, which forms a portion of a tank circuit that is designed to resonate at the frequency of the electromagnetic field. The resonant frequency of the tank circuit is determined by the following formula:

$$f = \frac{1}{2\pi\sqrt{LC}}$$

in which, f is the resonant frequency of the tank circuit, L is the equivalent inductance of the tank circuit, and C is the capacitance of the tank circuit.

The amount of voltage induced in a coil antenna is known to be proportional to the number of turns in the coil antenna. Thus, increasing the number of turns in a coil antenna increases the induced voltage in the coil antenna. Increasing the number of turns in the coil antenna, however, also increases the inductance of the coil antenna. Therefore, as the number of turns of the coil antenna is increased for inducing higher voltages, the inductance of the coil antenna also increases. As a result, in order to maintain the same resonant frequency of the tank circuit, the capacitance of the tank circuit must be lowered by the same factor that the inductance of the tank circuit was increased. For example, when the inductance of the tank circuit is doubled as a result of adding additional turns to the coil antenna, the capacitance of the tank circuit must be cut in half to maintain the same resonant frequency for the tank circuit, as is clear from the formula set forth above.

When the capacitance of the tank circuit becomes small, the tank circuit becomes overly sensitive environment changes, such as, for example, temperature. An environmentally sensitive tank circuit is impractical for use in a tire-based unit of a tire parameter sensing system since the environmental conditions experienced within a vehicle tire vary dramatically, particularly, with regard to temperature.

SUMMARY OF THE INVENTION

The present invention relates to an antenna for use in inductive coupling two devices. The antenna comprises a first coil having a first inductance value, a second coil having a second inductance value, and a capacitor having a capacitance value. The first and second coils and the capacitor form a tank circuit having a predetermined resonant frequency. The capacitance value of the capacitor varies inversely to an equivalent inductance value of the tank circuit for providing the predetermined resonant frequency. The first and second coils are connected in parallel with one another so that the equivalent inductance value of the tank circuit is less than each of the first and second inductance values and the capacitance value of the capacitor is maintained above a predetermined threshold value for providing stability to the tank circuit.

According to another aspect, the present invention relates to a tire parameter sensing system for sensing a parameter of a tire of a vehicle. The tire parameter sensing system comprises a vehicle-based unit, and a tire-based unit that is associated with the tire of the vehicle. The tire-based unit is operative for sensing the parameter of the tire and for providing an indication of the sensed parameter to the vehicle-based unit. The vehicle-based unit and the tire-based unit include associated structures for inductively coupling the tire-based unit to the vehicle-based unit so as to provide electrical energy to the tire-based unit. The associated structures include an antenna having first and second coils and a capacitor. The first coil has a first inductance value. The second coil has a second inductance value. The capacitor has a capacitance value. The first and second coils and the capacitor form a tank circuit having a predetermined resonant frequency. The capacitance value of the capacitor varies inversely to an equivalent inductance value of the tank circuit for providing the predetermined resonant frequency. The first and second coils are connected in parallel with one another so that the equivalent inductance value of the tank circuit is less than each of the first and second inductance values and the capacitance value of the capacitor is maintained above a predetermined threshold value for providing stability to the tank circuit.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 1 schematically illustrates a vehicle including a tire parameter sensing system constructed in accordance with an exemplary embodiment of the present invention;

FIG. 2 is a schematic block diagram of a tire-based unit of the tire parameter sensing system of FIG. 1;

DESCRIPTION OF THE PREFERRED EMBODIMENT

Figure 3:
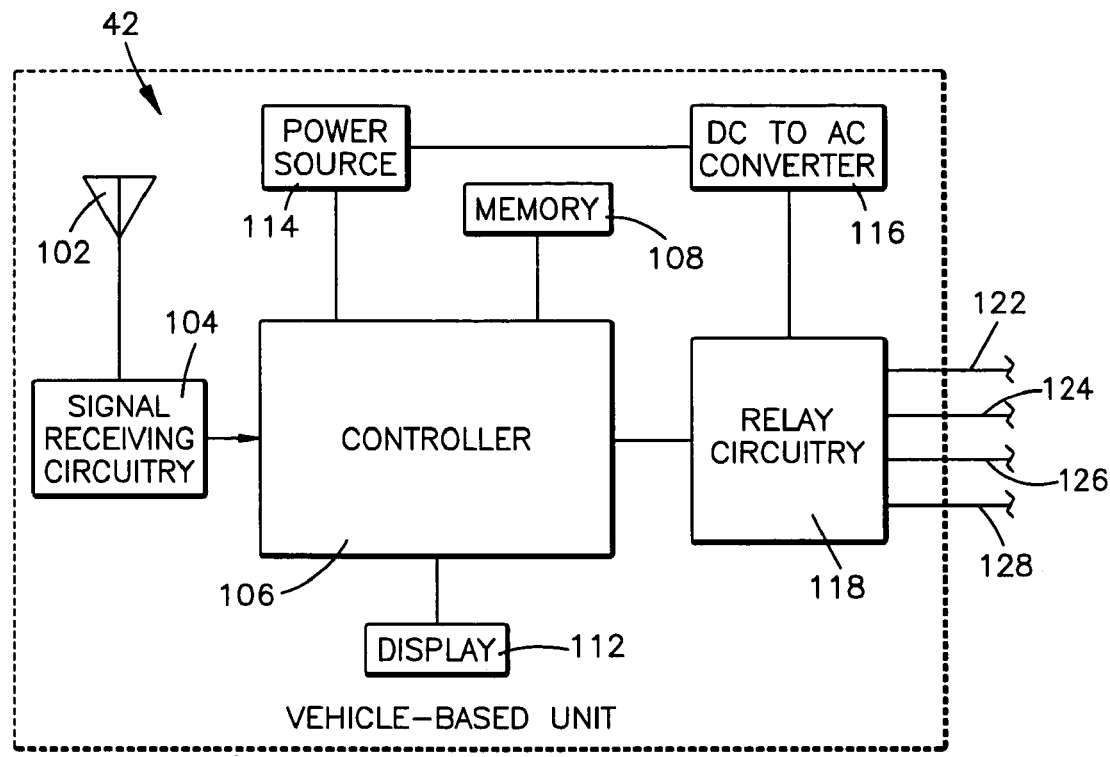
FIG. 3 is a schematic block diagram of a vehicle-based unit of the tire parameter sensing system of FIG. 1.

FIG. 1 schematically illustrates a vehicle 10 including a tire parameter sensing system 12 constructed in accordance with an exemplary embodiment of the present invention. For illustrative purposes, the vehicle 10 of FIG. 1 is an automobile having four tires 16,18, 20, and 22. The present invention can be used with vehicles having a number of tires other than four.

The vehicle 10 has a front 24, a rear 26, and opposite left and right sides 28 and 30, respectively. FIG. 1 illustrates tire 16 at a front left corner location of the vehicle 10. Tire 18 is located at a front right corner location of the vehicle 10. Tire 20 is located at a rear left corner location of the vehicle 10 and tire 22 is located at a rear right corner location of the vehicle 10.

The tire parameter sensing system 12 includes four tire-based units 34, 36, 38, and 40, a vehicle-based unit 42, and four power transmitting antennas 44, 46, 48, and 50. Each tire 16, 18, 20, and 22 of the vehicle 10 includes an associated tire-based unit 34, 36, 38, and 40, respectively, for sensing at least one parameter, e.g., pressure, temperature, etc., of the tire and for providing a tire parameter signal 54, 56, 58, and 60, respectively, to the vehicle-based unit 42. The tire parameter signals 54, 56, 58, and 60 are indicative of the sensed parameter(s) of the tires 16, 18, 20, and 22, respectively. Preferably, the tire parameter signals 54, 56, 58, and 60 are radio frequency ("RF") signals.

Each of the tire-based unit 34, 36, 38, and 40 has an associated one of the power transmitting antennas 44, 46, 48, and 50. In the embodiment illustrated in FIG. 1, power transmitting antenna 44 is associated with tire-based unit 34, power transmitting antenna 46 is associated with tire-based unit 36, power transmitting antenna 48 is associated with tire-based unit 38, and power transmitting antenna 50 is associated with tire-based unit 40. Preferably, each of the power transmitting antennas 44, 46, 48, and 50 is located in a wheel well of the vehicle 10 adjacent the tire 16, 18, 20, or 22 having the tire-based unit 34, 36, 38, or 40 with which the power transmitting antenna is associated.

The power transmitting antennas 44, 46, 48, and 50 are operatively coupled to the vehicle-based unit 42 and are actuatable for producing electromagnetic fields. The power transmitting antennas 44, 46, 48, and 50 may have any known structure for producing the electromagnetic fields, such as, for example, a ferromagnetic core and a winding 66 that is wrapped around the core. Preferably, the electromagnetic fields have frequencies of approximately 13 MHz.

FIG. 2 is a schematic block diagram of an exemplary embodiment of a tire-based unit of the parameter sensing system 12 of FIG. 1. For purposes of example, FIG. 2 only illustrates tire-based unit 34. Tire-based units 36, 38, and 40 may have structures similar to tire-based unit 34 and may operate in a manner similar to tire-based unit 34.

The tire-based unit 34 includes a parameter sensing portion 72 and an energy supplying portion 74. The parameter sensing portion 72 of the tire-based unit 34 includes a temperature sensor 78, a pressure sensor 80, and other sensors 82. The temperature sensor 78 is operable for sensing temperature within the associated tire 16 and providing temperature signals. The pressure sensor 80 is operable for sensing pressure within the associated tire 16 and for providing pressure signals. The other sensors 82 are operable for sensing other parameters of either the associated tire 16 or the tire-based unit 34 and for providing other parameter signals indicative of the other sensed parameters. For example, the other sensors 82 may include a voltage sensor for determining a supply voltage within the tire-based unit 34.

The parameter sensing portion 72 of the tire-based unit 34 also includes a controller 84. The controller 84 is preferably a microcomputer. Alternatively, the controller 84 may be formed from discrete circuitry, an application-specific-integrated-circuit ("ASIC"), or any other type of control circuitry. The controller 84 is operatively coupled to the temperature sensor 78, the pressure sensor 80, and the other sensors 82 and receives the temperature signals, the pressure signals, and the other parameter signals. The controller 84 performs a tire parameter sensing algorithm and outputs a message packet that includes information indicative of one or more of the sensed temperature, pressure, and other parameters. Any known tire parameter sensing algorithm may be used with the present invention.

A memory 86 is operatively coupled to the controller 84. Alternatively, the memory 86 may form a portion of the controller 84. The memory 86 is a non-volatile memory. The tire parameter sensing algorithm is stored in the memory 86. The memory 86 also stores an identification code for identifying the tire-based unit 34. Each tire-based unit 34, 36, 38, and 40 has a unique associated identification code. The controller 84 includes the identification code in the output message packet.

The parameter sensing portion 72 of the tire-based unit 34 also includes signal transmitting circuitry 90. The signal transmitting circuitry 90 is operatively coupled to the controller 84 and includes circuitry, such as a radio frequency ("RF") amplifier (not shown) and other known circuitry, for transmitting the parameter signal 54 via a transmitting antenna 92. The signal transmitting circuitry 90 receives message packets from the controller 84 and transmits the message packets in the tire parameter signals 54. The message packets are modulated onto a constant frequency carrier signal using known modulation techniques, such as, for example, amplitude shift keying ("ASK"). Other signal modulation techniques, such as frequency shift keying, phase shift keying, etc., are also contemplated by the present invention.

The energy supplying portion 74 of the tire-based unit 34 includes an energy receiving antenna 96, rectifying and regulating circuitry 98, and an energy storage device. Electrical energy, i.e., a voltage and a current, is induced in the energy receiving antenna 96 when the antenna is placed within an electromagnetic field. The electromagnetic field is produced by alternating current. Therefore, the polarity of the electromagnetic field alternates with the polarity of the alternating current. As a result, the electrical energy induced in the energy receiving antenna 96 also has an alternating current.

The rectifying and regulating circuitry 98 receives the electric energy from the energy receiving antenna 96, converts the alternating current of the received electrical energy into direct current, and outputs electrical energy having a regulated direct current. The rectifying and regulating circuitry 98 provides the rectified and regulated electrical energy to the energy storage device 100. The energy storage device 100 may include one or more capacitors for storing the rectified and regulated electrical energy. The energy storage device 100 supplies electrical energy to the controller 84 of the parameter sensing portion 72 of the tire-based unit 34 for powering the tire-based unit.

FIG. 3 is a schematic block diagram of an exemplary embodiment of the vehicle-based unit 42 of the tire parameter sensing system 12 of FIG. 1. The vehicle-based unit 42 includes a receiving antenna 102 that is coupled to signal receiving circuitry 104. The signal receiving circuitry 104 receives tire parameter signals, e.g., parameter signal 54 (FIG. 1), from the receiving antenna 102. The signal receiving circuitry 104 includes signal conditioning circuitry (not shown), such as filters, amplifiers, etc. The signal receiving circuitry 104 also includes signal demodulating circuitry (not shown) for demodulating the received tire parameter signals and for outputting message packets received in the tire parameter signals to a controller 106 of the vehicle-based unit 42.

The controller 106 of the vehicle-based unit 42 is preferably a microcomputer. Alternatively, the controller 106 may be formed from discrete circuitry, an application-specific-integrated-circuit ("ASIC"), or any other type of control circuitry. The controller 106 also performs a tire parameter sensing algorithm.

The controller 106, upon receiving a message packet from the signal receiving circuitry 104, determines whether the message packet originated in one of the tire-based units 34, 36, 38, or 40 (FIG. 1) of the tire parameter sensing system 12. To determine whether the message packet originated in one of the tire-based units 34, 36, 38, or 40, the controller 106 compares the identification code received in the message packet to identification codes stored in a memory 108 associated with the controller 106. The memory 108 is a non-volatile memory-that includes a lookup table having the identification codes of the tire-based units 34, 36, 38, and 40 of the tire parameter sensing system 12. The lookup table may also include associated location information-for each tire-based unit 34, 36, 38, and 40. For example, the look-up table stored in memory 108 may associate the identification code of tire-based unit 34 with the front left corner location of the vehicle 10.

When the controller 106 determines that the received message packet did not originate from one of the tire-based units 34, 36, 38, or 40, the controller 106 ignores the message packet. When the controller 106 determines that the received message packet did originate from one of the tire-based units 34, 36, 38, or 40, the controller 106 analyzes the tire parameter information received in the message packet, i.e., the information indicating the temperature, the pressure, and/or the other sensed parameters.

The controller 106, after analyzing the tire parameter information received in the message packet, outputs display signals to a display 112. The display 112 is located in the occupant compartment of the vehicle 10 and is operatively coupled to the controller 106. The display 112 is responsive to receipt of display signals for providing an indication of the tire parameter information and, optionally, the associated corner location. For example, the display 112 may provide an indication of sensed tire temperatures and sensed tire pressures for each of the tires 16, 18, 20, and 22.

The vehicle-based unit 42 also includes a power source 114. The power source 114 of the vehicle-based unit 42 provides electrical power to the controller 106 for powering the vehicle-based unit. The power source 114 preferably includes the battery of the vehicle 10 and an appropriate voltage regulator (not shown).

The power source 114 is also connected to a direct current ("DC") to alternating current ("AC") converter 116, such as an oscillator. The DC to AC converter 116 outputs electrical energy having an alternating current to relay circuitry 118. The relay circuitry 118 includes four relay switches (not shown) and is also operatively connected to the controller 106. The controller 106 controls the opening and closing of the four relay switches of the relay circuitry 118. Output wires 122, 124, 126, and 128 connect the relay circuitry 118 to the power transmitting antennas 44, 46, 48, and 50, as is shown in FIG. 1.

Each output wire 122, 124, 126, and 128 has an associated relay switch of the relay circuitry 118. When the controller 106 controls the relay circuitry 118 to close a relay switch, electrical energy having an alternating current is supplied to the power transmitting antenna 44, 46, 48, or 50 that is associated with the closed relay switch. The power transmitting antennas 44, 46, 48, and 50 are responsive to the alternating current for producing magnetic fields.

As an alternative to the embodiment illustrated in FIG. 3, the relay circuitry 118 may receive electrical energy having a direct current and multiple DC to AC converters may be located in series with the output wires 122, 124, 126, and 128 for converting the alternating current to direct current. The multiple DC to AC converters may be located either at the vehicle-based unit 42 or remote from the vehicle-base unit, such as near the power transmitting antennas 44, 46, 48, and 50.

Figure 4:
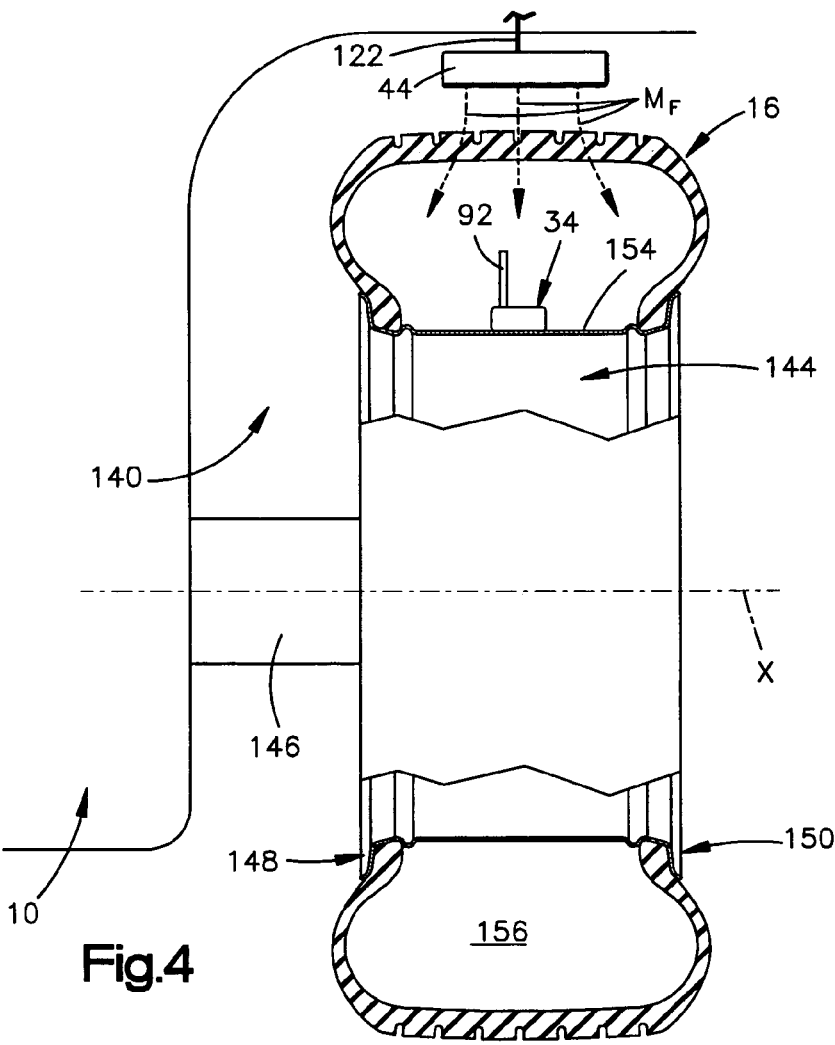
FIG. 4 schematically illustrates a portion of the tire parameter sensing system constructed in accordance with an exemplary embodiment of the present invention.

FIG. 4 illustrates a wheel well 140 located at the front left corner of the vehicle 10. Tire 16 is located in the wheel well 140. For purposes of example, FIG. 4 also illustrates the power transmitting antenna 44 and the tire-based unit 34 that are associated with tire 16. The power transmitting antennas 46, 48, and 50 and the tire-based units 36, 38, and 40 that are associated with tires 18, 20 and 22, respectively, may have structures similar to those illustrated and described with reference to FIG. 4.

Tire 16 is mounted to a rim 144 that is attached to an axle 146 of the vehicle 10. The rim 144 includes two bead flanges 148 and 150 to which the tire 16 is attached. The tire-based unit 34 is attached to a circumferential outer surface 154 of the rim 144 that is located between the bead flanges 148 and 150 so that the tire-based unit is located within a cavity 156 of tire 16. The rim 144 is preferably formed from a magnetically conductive material that acts as a guide for the magnetic flux of the electromagnetic field that is produced by the power transmitting antenna 44. The dashed arrows labeled $M_F$ in FIG. 4 schematically illustrate the magnetic flux of the electromagnetic field produced by power transmitting antenna 44.

Figure 5:
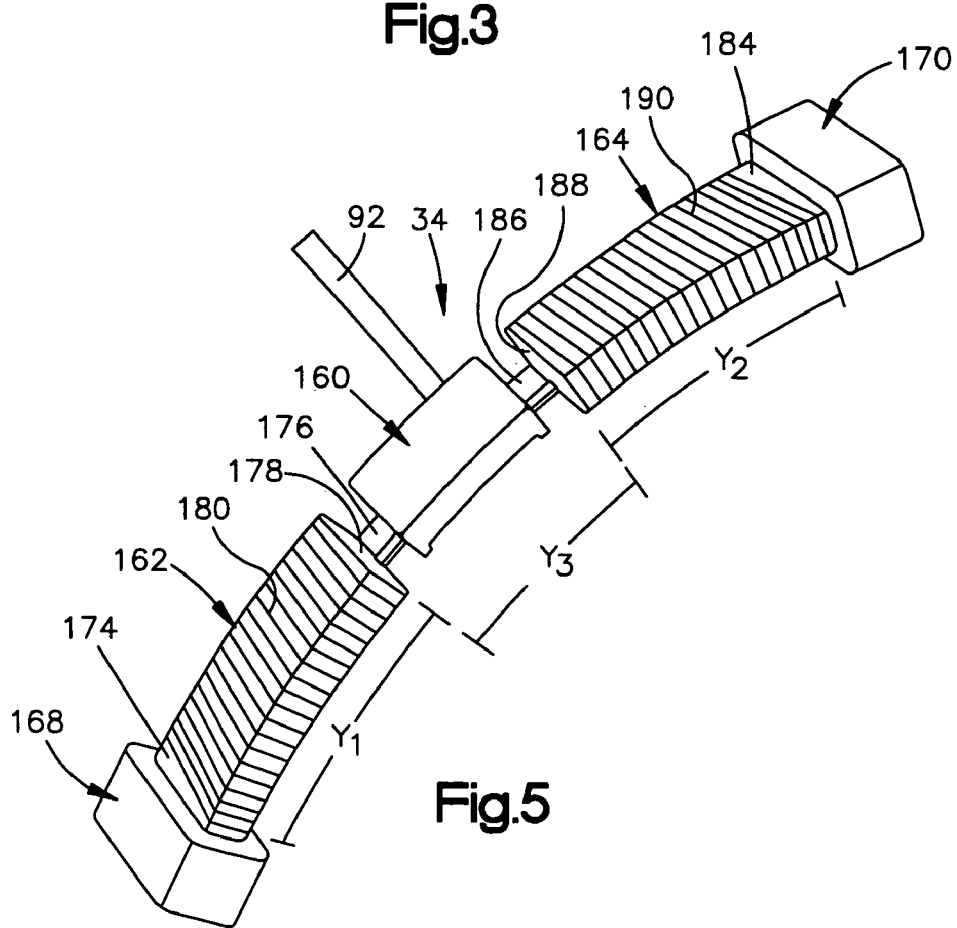
FIG. 5 is a perspective view of a tire-based unit constructed in accordance with an exemplary embodiment of the present invention.

FIG. 5 is a perspective view of the tire-based unit 34 constructed in accordance with an exemplary embodiment of the present invention. For brevity, the only tire-based unit 34 is discussed in detail with reference to FIGS. 5 and 6.

Tire-based units 36, 38, and 40 may be constructed in the same manner as tire-based unit 34.

Tire-based unit 34 includes a housing 160 and first and second coil portions 162 and 164, respectively. The first and second coil portions 162 and 164 are located on opposites sides of the housing 160 adjacent first and second end caps 168 and 170, respectively, of the tire-based unit 34. The tire-based unit 34 is elongated between the first and second end caps 168 and 170 and has a curved profile. Preferably, the tire-based unit 34 has a length between the first and second endcaps 168 and 170 of approximately 150 millimeters. The curvature of the tire-based unit 34 is equivalent to the curvature of the outer surface 154 of the rim 144, when measured relative to a central axis X (FIG. 4) of the rim. Thus, when the tire-based unit 34 is mounted to the rim 144, the tire-based unit 34 extends parallel to the outer surface 154 of the rim 144.

As is shown schematically with reference to FIG. 2, the housing 160 includes the parameter sensing portion 72 of the tire-based unit 34 with the exception of the transmitting antenna 92. The housing 160 also includes the rectifying and regulating circuitry 98 and the energy storage device 100 of the energy supplying portion 74 of the tire-based unit 34. Although not shown in FIG. 5, the housing 160 also includes vent holes for opening an interior of the housing to the atmosphere within the cavity 156 (FIG. 4) of the tire 16.

As is shown in FIG. 5, the transmitting antenna 92 of the parameter sensing portion 72 of the tire-based unit 34 extends outwardly of the housing 160 in a direction perpendicular to a tangent of the curvature of the tire-based unit. As a result, when the tire-based unit 34 is mounted to the rim 144, as is shown in FIG. 4, the transmitting antenna 92 extends away from the outer surface 154 of the rim 144 and into the cavity 156 of the tire 16. The transmitting antenna 92 preferably extends away from the outer surface 154 of the rim 144 and beyond the bead flanges 148 and 150, when measured relative to the central axis X of the rim 144.

The first coil portion 162 of the tire-based unit 34 includes an elongated, hollow plastic body portion 174. In an exemplary embodiment, the body portion 174 has a length of 50 millimeters. The body portion 174 is molded from plastic and has a generally rectangular cross-sectional shape with a predetermined cross-sectional area. A first support arm 176 connects the body portion 174 of the first coil portion 162 to the housing 160. The body portion 174 includes a first end surface that is connected to end cap 168 and an opposite second end surface 178 that is connected to the first support arm 176.

The first coil portion 162 of the tire-based unit 34 also includes a coil 180. The coil 180 forms a portion of the energy receiving antenna 96 of the tire-based unit 34. The coil 180 extends around the body portion 174 of the first coil portion 162 in a counter-clockwise direction, when viewed from the first end cap 168. The coil 180 is preferably formed from a coated copper wire. The coil 180 has a predetermined number of turns, a cross-sectional area that is equal to the cross-sectional area of the body portion 174, and a predetermined length $Y_1$. As a result, the coil 180 has a first inductance value $L_1$. In an exemplary embodiment of the invention, the number of turns of the coil 180 is thirty, the length of the coil 180 is approximately 45 millimeters, and the first inductance value $L_1$ of the coil 180 is approximately 11 $\mu$H ("micro-Henry"). Although not shown in FIG. 5, leads that connect the coil 180 to the circuitry within the housing 160 extend through the first support portion 176.

The second coil portion 164 of the tire-based unit 34 includes an elongated, hollow plastic body portion 184. In an exemplary embodiment, the body portion 184 has a length of approximately 50 millimeters. The body portion 184 is molded from plastic and has a generally rectangular cross-sectional shape with a predetermined cross-sectional area. Preferably, the cross-sectional area of the body portion 184 is equal to the cross sectional area of the body portion 174. A second support arm 186 connects the body portion 184 of the second coil portion 164 to the housing 160. The body portion 184 includes a first end surface 188 that is connected to the second support arm 186 and an opposite second end surface that is connected to end cap 170.

The second coil portion 164 of the tire-based unit 34 also includes a coil 190. The coil 190 also forms a portion of the energy receiving antenna 96 of the tire-based unit 34. The coil 190 extends around the body portion 184 of the second coil portion 164 in a clockwise direction, when viewed from the first end cap 168. Thus, the coils 180 and 190 are wrapped around their associated body portions 174 and 184, respectively, in opposite directions. The coil 190 is preferably formed from a coated copper wire. The coil 190 has a predetermined number of turns, a cross-sectional area that is equal to the cross-sectional area of the body portion 184, and a predetermined length $Y_2$. As a result, the coil 190 has a second inductance value $L_2$. In an exemplary embodiment of the invention, the number of turns of the coil 190 is thirty, the length of the coil 190 is approximately 45 millimeters, and the second inductance value $L_2$ is approximately 11 $\mu$H. Although not shown in FIG. 5, leads that connect the coil 190 to the circuitry within the housing 160 extend through the second support portion 186.

As is shown in FIG. 5, the coils 180 and 190 are spaced from one another by a predetermined distance, indicated as $Y_3$ in FIG. 5. The housing 160 and the first and second support arms 176 and 186 are interposed between the coils 180 and 190 and extend over the predetermined distance $Y_3$. The predetermined distance $Y_3$ is chosen so as to prevent mutual inductance between coils 180 and 190. Mutual inductance is flux linkage that is induced in one coil in response to a change in current in another coil. In an exemplary embodiment of the invention, the predetermined distance $Y_3$ between the coils 180 and 190 is approximately 50 millimeters. Thus, in the exemplary embodiment, in which the coils 180 and 190 have lengths of 45 millimeters, the spacing between the coils 180 and 190 is greater than the length of each of the coils.

Figure 6:
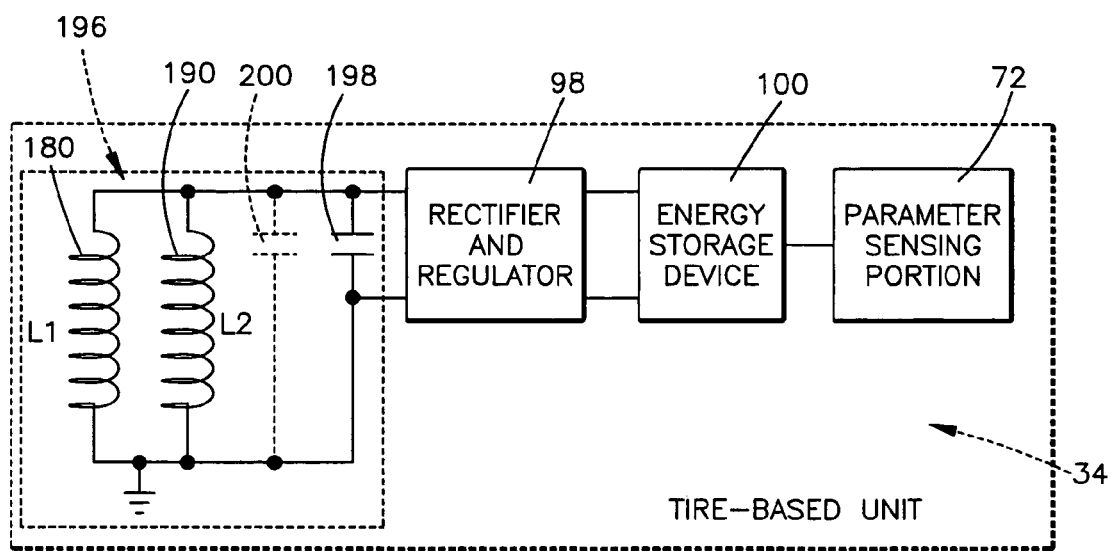
FIG. 6 is an equivalent circuit diagram of the tire-based unit of FIG. 5.

FIG. 6 is an equivalent circuit diagram of the tire-based unit 34 of FIG. 5. As shown in FIG. 6, the coils 180 and 190 form a portion of a tank circuit 196. The coils 180 and 190 of the tire-based unit 34 are wired in parallel with one another. As a result, the equivalent inductance of the tank circuit 196 is less than each of the first and second inductance values $L_1$ and $L_2$. When the first and second inductance values $L_1$ and $L_2$ are 11 $\mu$H, the equivalent inductance of the tank circuit 196 is 5.5 $\mu$H.

The tank circuit also includes a capacitor 198 and a parasitic capacitance 200. The capacitor 198 is wired in parallel with the first and second coils 180 and 190. In an exemplary embodiment, the capacitor 198 has a capacitance value of approximately 22 pF ("pico-Farad"). The parasitic capacitance occurs as a result of the close spacing between the turns of the wires in coils 180 and 190. As a result, each of the coils 180 and 190 has an associated parasitic capacitance. FIG. 6 shows the associated parasitic capacitances of coils 180 and 190 as capacitance 200.

The tank circuit 196 has a resonant frequency of approximately 13 MHz. As stated previously, the resonant frequency of a tank circuit is determined by the formula:

$$f = \frac{1}{2\pi\sqrt{LC}}$$

in which, f is the resonant frequency of the tank circuit 196, L is the equivalent inductance of the tank circuit, and C is the capacitance of the tank circuit. With reference to FIG. 6, since the coils 180 and 190 are wired in parallel to one another, the equivalent inductance value of the tank circuit 196 is less than each of the first and second inductance values $L_1$ and $L_2$. Thus, by wiring the coils 180 and 190 in parallel with one another, the total number of turns of the energy receiving antenna 96, i.e., the sum of the number of turns of coils 180 and 190, can be increased, while the equivalent inductance of the tank circuit 196 is decreased. Compared to an antenna that uses only one single coil with the equivalent inductance of the tank circuit 196, each energy receiving antenna 96 having the two coil structure, coils 180 and 190, will have a greater number of turns. As a result of the greater number of turns, the amount voltage induced in the energy receiving antenna is greater. Also, when the two coils 180 and 190 are connected in parallel, the current gain doubles. Thus, the total energy received in the two coil antenna of the present invention may be up to 4 times greater than the total energy received in a single coil antenna having the same equivalent inductance. Moreover, decreasing the equivalent inductance of the tank circuit 196 by connecting the coils 180 and 190 in parallel with one another enables the capacitance value of the capacitor 198 of the tank circuit 196 to be maintained above a predetermined threshold value for maintaining stability of the tank circuit. Preferably, the capacitance value of the capacitor 198 is maintained above a predetermined threshold value of approximately 20 pF.

As is shown in FIG. 6, the tank circuit 196 is operatively coupled to the rectifying and regulating circuitry 98, the energy storage device 100, and the parameter sensing portion 72 of the tire-based unit 34. When the energy storage device 100 includes one or more capacitors, the energy storage device 100 is isolated from the tank circuit 196, preferably, using diodes, so that the capacitance of the energy storage device 100 does not affect the capacitance value of the tank circuit 196.

Experiments conducted using the tire-based unit 34 of FIG. 5 indicate that approximately three times as much electrical energy is induced in the coils. 180 and 190 as compared to a tire-based unit having only a single coil that is configured similarly to one of the coils 180 and 190. Thus, the two coils 180 and 190 wired in parallel with one another as shown in FIG. 6 and mounted to a rim 144 as shown in FIG. 4 provide a significant increase in the induced energy while maintaining the capacitance value of the tank circuit 196 above the predetermined threshold value, e.g., above 20 pF.

From the above description of the invention, those skilled in the art will perceive improvements, changes and modifications. For example, the energy receiving antenna 96 may include a number of coils greater than two wired in parallel with one another. Also, a similar antenna having multiple coils wired in parallel might be used in the power transmitting antennas 44, 46, 48, and 50 to transmit the electromagnetic field. Such improvements, changes and modifications within the skill of the art are intended to be covered by the appended claims.

The invention claimed is:

1. A tire parameter sensing system for sensing a parameter of a tire of a vehicle, the tire parameter sensing system comprising:

a vehicle-based unit; and a tire-based unit that is associated with the tire of the vehicle, the tire-based unit being operative for sensing the parameter of the tire and for providing an indication of the sensed parameter to the vehicle-based unit, the vehicle-based unit and the tire-based unit including associated structures for inductively coupling the tire-based unit to the vehicle-based unit so as to provide electrical energy to the tire-based unit, the associated structures including an antenna having first and second coils and a capacitor, the first coil having a first inductance value, the second coil having a second inductance value, and the capacitor having a capacitance value, the first and second coils and the capacitor forming a tank circuit having a predetermined resonant frequency, the capacitance value of the capacitor varying inversely to an equivalent inductance value of the tank circuit for providing the predetermined resonant frequency, the first and second coils being connected in parallel with one another so that the equivalent inductance value of the tank circuit is less than each of the first and second inductance values and the capacitance value of the capacitor is maintained above a predetermined threshold value for providing stability to the tank circuit.

2. The tire parameter sensing system of claim 1 wherein the first and second coils are spaced apart from one another so as to prevent mutual inductance between the first and second coils.

3. The tire parameter sensing system of claim 1 wherein the first and second coils are wound in opposite directions relative to one another.

4. The tire parameter sensing system of claim 1 wherein the first and second coils are elongated and have curved profiles, the antenna forming a portion of the tire-based unit and being mountable to a rim having a curved outer surface, the curved profiles of the first and second coils enabling the first and second coils to be mounted in a direction parallel to the curved outer surface of the rim.

5. The tire parameter sensing system of claim 1 wherein the predetermined resonant frequency of the tank circuit is approximately 13 mega-Hertz and wherein the predetermined threshold value for the capacitor is approximately 20 pico-Farad, the predetermined threshold value of the capacitor providing stability to the antenna during varying environmental conditions experienced by the tire parameter sensing system.

6. The tire parameter sensing system of claim 2 wherein the first and second coils have predetermined lengths, the first and second coils being spaced apart from one another by a distance that is greater than each of the predetermined lengths.

7. The tire parameter sensing system of claim 2 wherein the antenna forms a portion of the tire-based unit, a parameter sensing portion of the tire-based unit being interposed between the first and second coils and spacing the first and second coils apart from one another.

8. The tire parameter sensing system of claim 4 wherein the tire-based unit further includes a transmitting antenna for transmitting parameter signals to the vehicle-based unit, the transmitting antenna extending in a direction perpendicular to a tangent of the curved outer surface of the rim when the first and second coils are mounted to the rim in the direction parallel to the curved outer surface.

* * * * *